United States Patent
Acker et al.

(10) Patent No.: US 8,009,512 B2
(45) Date of Patent: *Aug. 30, 2011

(54) NETWORKED SONAR OBSERVATION OF SELECTED SEABED ENVIRONMENTS

(75) Inventors: Timothy W. Acker, Arlington, WA (US); Assad E. K. Ebrahim, Bellevue, WA (US); James J. Dawson, Edmonds, WA (US)

(73) Assignee: BioSonics, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/694,927

(22) Filed: Jan. 27, 2010

(65) Prior Publication Data

US 2010/0128567 A1 May 27, 2010

Related U.S. Application Data

(63) Continuation of application No. 12/236,352, filed on Sep. 23, 2008, now Pat. No. 7,679,995, which is a continuation of application No. 11/458,011, filed on Jul. 17, 2006, now Pat. No. 7,457,196.

(51) Int. Cl.
*G01S 15/89* (2006.01)
(52) U.S. Cl. ........................................................ 367/88
(58) Field of Classification Search .................... 367/88, 367/11, 7, 902, 131, 134
See application file for complete search history.

(56) References Cited

U.S. PATENT DOCUMENTS

| 3,541,499 A | 11/1970 | Lange |
| 6,850,173 B1 | 2/2005 | Steinbrecher |
| 7,457,196 B2 | 11/2008 | Acker et al. |
| 7,679,995 B2 * | 3/2010 | Acker et al. ..................... 367/88 |
| 2006/0013068 A1 | 1/2006 | Wilson |
| 2006/0018197 A1 | 1/2006 | Burczynski et al. |
| 2008/0013404 A1 | 1/2008 | Acker et al. |
| 2009/0073810 A1 | 3/2009 | Acker et al. |
| 2010/0128567 A1 * | 5/2010 | Acker et al. ..................... 367/88 |

* cited by examiner

*Primary Examiner* — Dan Pihulic

(74) *Attorney, Agent, or Firm* — Black Lowe & Graham PLLC

(57) ABSTRACT

A sonar transducer network for observing a seabed includes a controller. A first transducer assembly includes a first acoustic transducer to convert a first ping to a first electrical signal; and a first transducer processor to receive a first electrical signal from the first acoustic transducer to generate the first transducer data. At least one second transducer assembly is spaced apart from the first transducer assembly. The second transducer assembly includes a second acoustic transducer to convert a second ping to a second electrical signal. The second transducer processor receives the second electrical signal from the second acoustical transducer to generate second transducer data. A network bus communicates first transducer data and second transducer data with the controller.

25 Claims, 8 Drawing Sheets

NETWORKED SONAR OBSERVATION OF SELECTED SEABED ENVIRONMENTS

PRIORITY CLAIM

This application is a continuation of co-pending, commonly-owned U.S. patent application Ser. No. 12/236,352 filed on Sep. 23, 2008, which is a continuation of co-pending, commonly-owned U.S. patent application Ser. No. 11/458,011 filed Jul. 17, 2006 entitled "NETWORKED SONAR OBSERVATION OF SELECTED SEABED ENVIRONMENTS", which is fully incorporated herein.

FIELD OF THE INVENTION

This invention relates generally to sonar and, more specifically, to collecting and compiling return data from networked sonar transducer assemblies.

BACKGROUND OF THE INVENTION

Whales, seals, sea lions, catadromous fish such as eels and anadromous fish such as shad and salmon all migrate through confined waterways such as Puget Sound or Alaska's Inside Passage. The main means of determining populations and movement have been through spotting, i.e. human observers at chokepoints. Chokepoints have been traditionally at passages through which the migrating population must pass. Where the passages have been synthetic and narrow, such as fish ladders, or at natural constrictions, such as the mouths of streams, the movement of the migratory population has been readily estimated by visual sighting. Generally, the narrower the constriction, the better the count.

Only anadromous fish, however, migrate into narrow streams where such counts are facilitated by constrictions in the migratory waterway. Cetacean species rarely enter freshwater streams and will not readily be counted in such confined waterways. Yet the whales do pass through some well-defined passages on their migratory routes.

Orca whales, for example, can be observed to move between Puget Sound in Washington, through the Strait of Georgia in British Columbia, then on to southeastern Alaska; traveling through Prince William Sound to the waters around Kodiak Island. Given the breadth of any of several inland passages, visual counting lacks a great deal of the certainty necessary to accurately gauge the extent of the Orca population as they migrate.

Complicating the count is the fact that within the same waters, Humpback, Grey and other cetacean species live and move. Discernment of one whale species from another in the same space is also necessary for accurately assessing the population. All of these species regularly pass through the same defined chokepoints in the inland waterways. Because whale movement is predictable and includes swimming through predicted passages, accurate counts could be obtained by monitoring the seabed environment at each of these chokepoints to discern passage.

Selected sonar frequencies have been found to detect whales without imparting injury to the whale's own sonar guidance system. Sonar, however, only propagates in a cone defining a solid angle. Counting schemes to date have placed the sonar across the mouth of a chokepoint. Very few chokepoints, however, can be effectively monitored by positioning a single solid angle cone, for doing so requires the assumption that the whales will pass in single file through the chokepoints. Ganging sonar installations has been one strategy for enhancing the accuracy of counting results by placing several transducers along the migration path and comparing results to come up with counts that are in good agreement. A second ganging strategy consists of filing a chokepoint with several transducer cones, stacked to completely and non-overlappingly fill the chokepoint, but such ganging suffers from a lack of coordination of results such that a single whale might be counted more than once by passing through each of several sonar cones. Additionally, finding such chokepoint spaces that are readily filled with such transducer cones is difficult.

What is needed, then, is a predictable means of monitoring defined chokepoints with coordinated sonar installations. Comprehensive monitoring of chokepoints in defined seabed environments facilitates counting by allowing in-depth observation of all movement within those seabed environments.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

By way of overview, a sonar transducer network for observing a seabed includes a controller. A first transducer assembly includes a first acoustic transducer to convert a first ping to a first electrical signal; and a first transducer processor to receive a first electrical signal from the first acoustic transducer to generate the first transducer data. At least one second transducer assembly is spaced apart from the first transducer assembly. The second transducer assembly includes a second acoustic transducer to convert a second ping to a second electrical signal. The second transducer processor receives the second electrical signal from the second acoustical transducer to generate second transducer data. A network bus communicates first transducer data and second transducer data with the controller.

Networked Transducer Assemblies with Two-Axis Mounts

Figure 1:
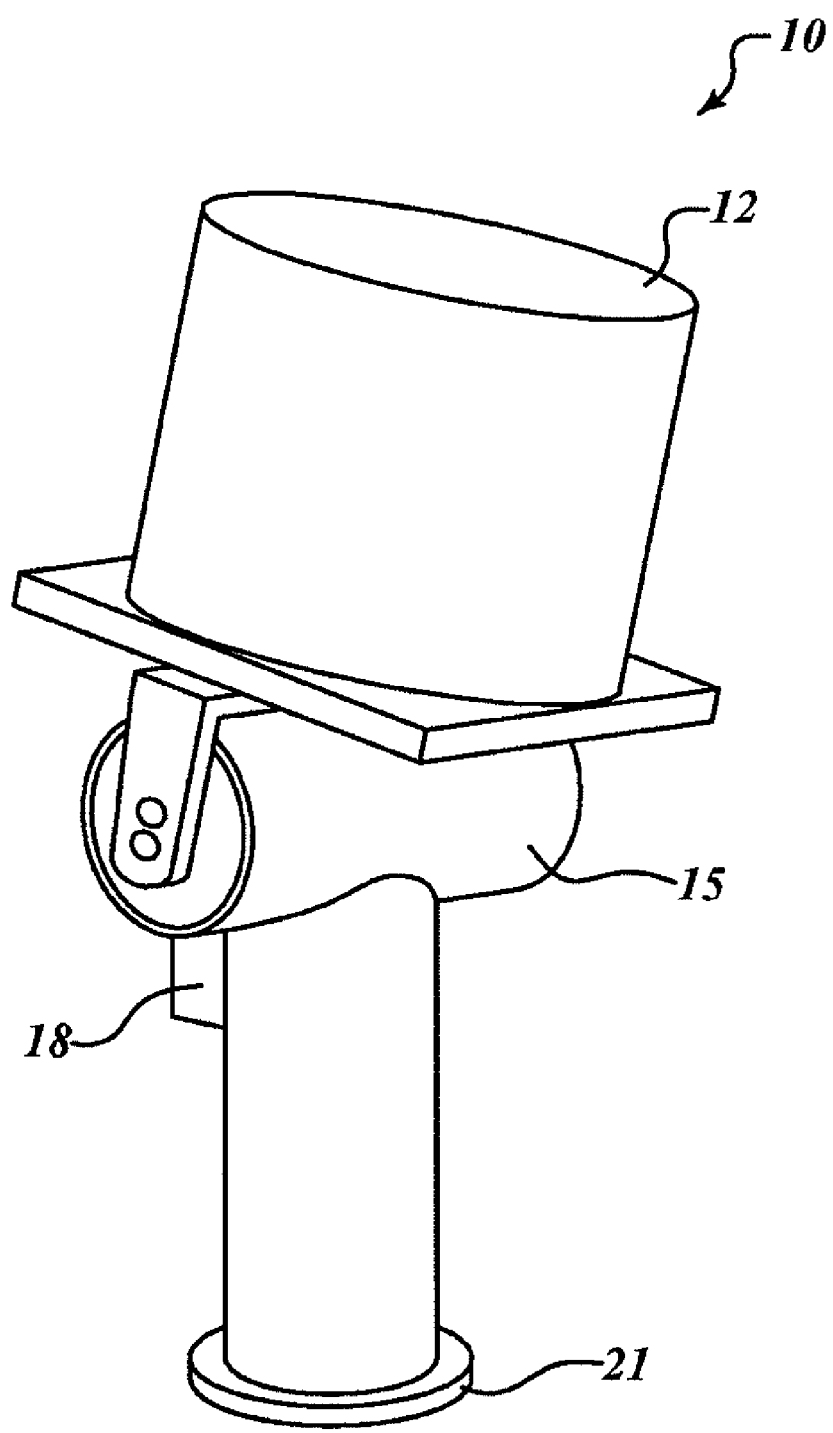
FIG. 1 is a perspective view of a transducer assembly.

FIG. 1 illustrates a non-limiting example of a transducer assembly 10 including a transducer electronics subassembly 12. The transducer electronics subassembly 12 includes a transducer processor (not shown) and a transducer (not shown) also referred to as transducer ceramics (referring to the fact that transducers commonly include piezoelectric ceramic transducers).

The transducer electronics subassembly 12 is mounted on a two-axis mount 15. The two-axis mount 15 serves as a platform not only for the transducer electronics subassembly 12 but also for such environmental sensors 18. By way of non-limiting example, environmental sensors include those which measure environmental conditions such as temperature, salinity, and relative pressure.

Sound speed is slower in fresh water than in sea water. In all water sound velocity is affected by density (or the mass per unit of volume). Density is affected by temperature, dissolved molecules (usually salinity), and pressure. The speed of sound (in feet per second) is approximately equal to 4388+ (11.25×temperature (in ° F.))+(0.0182×depth (in feet)+salinity (in parts-per-thousand)). This empirically derived approximation equation is reasonably accurate for normal temperatures, concentrations of salinity and the range of most ocean depths.

Ocean temperature varies with depth, but at between 30 and 100 meters there is often a marked change, called a thermocline, dividing the warmer surface water from the cold, still waters that make up the rest of the ocean. The presence of the thermocline can frustrate sonar, for a sound originating on one side of the thermocline tends to be bent, or refracted, off the thermocline. The thermocline may be present in shallower coastal waters; however, wave action will often mix the water column and eliminate the thermocline. Water pressure also affects sound propagation. Increased pressure increases the density of the water and raises the sound velocity. Increases in sound velocity cause the sound waves to refract away from the area of higher velocity. The mathematical model of refraction is called Snell's law. For these reasons, monitoring of ambient water temperature, salinity, and relative pressure optionally allows normalization of the speed of sound through the ambient water, thereby giving more precise ranging.

The Remote Ocean Systems™ two-axis pan and tilt mounts are one non-limiting example of a suitable two-axis mount. By way of further non-limiting example, a two-axis mount will include actuators for each axis including either of a reversible synchronous motor or a brushless stepper motor coupled to low backlash harmonic gearing. Optionally, rugged design of the gear train allows stalling of either output shaft without damage to the gears or the motors.

The two-axis mount is, optionally, equipped with internal limit switches and position feedback potentiometers on both axes. The potentiometers sense pan and tilt orientation angles for providing azimuth and depression angles (or "pan and tilt" angles) and present that information to the transducer processor (not shown) for inclusion in transducer data.

In the pictured embodiment of the two-axis mount 15 of the transducer assembly 10, a mounting flange 21 provides an advantageous means of affixing the two-axis mount 15 to a stationary hard point from which to operate.

Figure 2A:
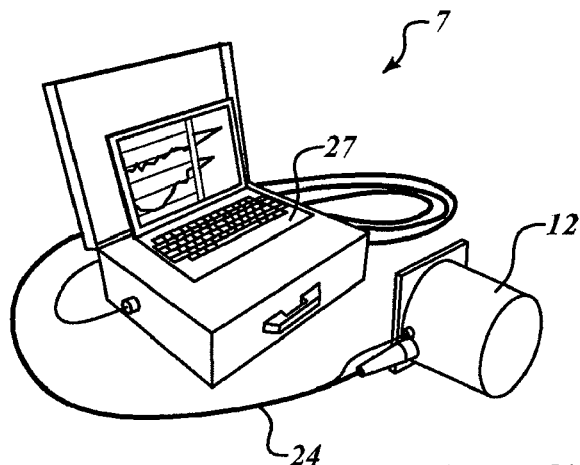
FIG. 2a is a perspective view of a networked sonar array with a single transducer assembly in networked communication.

Referring to FIG. 2a, an embodiment of a networked sonar transducer array 7 includes a transducer electronics subassembly 12, communicatively connected to a controller 27 by means of a network bus 24, in this case a waterproof Ethernet cable, through a network bus 24 including a fiber optic cable with suitable nodes or other such network means.

In a non-limiting exemplary embodiment, the communication between the controller 27 and any of at least one transducer electronics subassembly 12 is by means of addressing of packets from a sending node to a receiving node. In this application, the term Ethernet is used to reference all of the IEEE 802 LAN protocols, including but not limited to Token, FDDI, and ATM but because Ethernet has some common features with networking standards that are not part of the IEEE 802.3 Ethernet standard, but support the Ethernet frame format, and are capable of interoperating with it, the term Ethernet, as used herein any network over any bus such as a twisted pair; coaxial; fiber optic conduits; wave guides; or wireless networks such as WiFi or Bluetooth, or, importantly, any combination of the busses.

Addressing of packets is handled on Ethernet, as on all IEEE 802 LANs, by giving each peer a unique 48-bit MAC address. Network adapters normally do not pass packets intended for other Ethernet cards to the host to improve performance but can also be placed in promiscuous mode where they pass every packet to the host. Adapters generally come programmed with a globally unique address but this can be overridden either to avoid an address change when an adapter is replaced or to use locally administered addresses. The network bus 24 may be any network bus capable of supporting a LAN including the transducer electronics assembly 12.

Figure 2B:
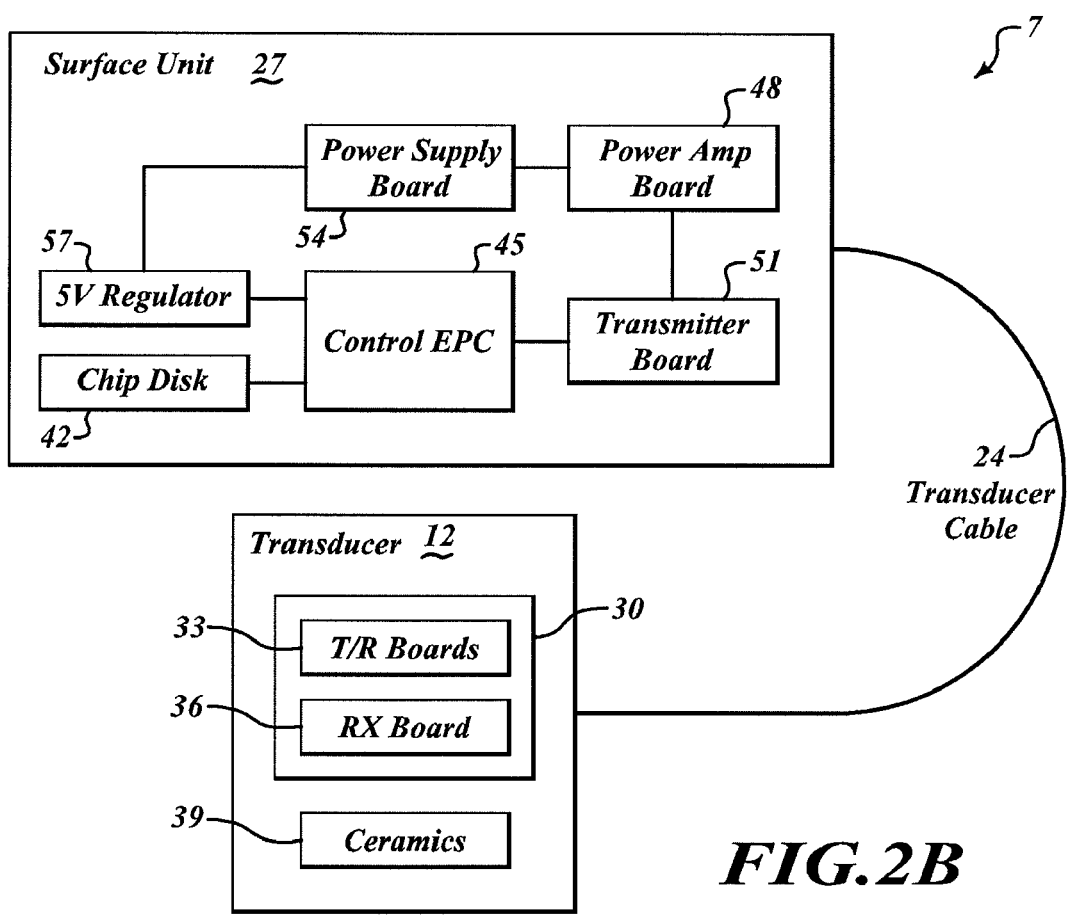
FIG. 2b is a block diagram of the networked sonar array with the single transducer assembly.

By way of further explanation of the basic networked sonar transducer array 7, reference to FIG. 2a shows a block diagram of the network bus 24 including transducer interface cards 33, 36 and a controller interface card 51 shown in FIG. 2b. Representing the same elements shown in the perspective view that is FIG. 1, the embodiment of the networked sonar transducer array 7 includes the transducer electronics subassembly 12, communicatively connected to the controller 27 by means of the network bus 24. Additionally, the controller 27 manages the network bus 24 including assignment of the resources on the network by means of dynamic host configuration protocol (DHCP). DHCP is an Internet protocol for automating the configuration of computers that communicate using the TCP/IP protocol. DHCP can be used to assign IP addresses, to deliver TCP/IP stack configuration parameters such as the subnet mask and default router. DHCP transmits other configuration information to each of the components on a network and assigns addresses for the controller 27 and the several transducer interface cards 33, 36.

Network management is set forth in a non-limiting embodiment by a server section of the controller 27 called a network controller 45. By way of non-limiting example, a network controller 45 includes a processor configured to manage the network traffic without requiring dedication of host CPU cycles. The network controller 45 facilitates networked communication by processing TCP/IP communications. Using an autonomous network controller 45 prevents formation of a bottleneck within the controller 27.

The network controller 45 operates responding to instructions within an operating system stored in machine-readable form on the non-volatile memory 42. By way of non-limiting example, the non-volatile memory in an embodiment is identified as a chipDISK™, a fully IDE-compatible flash hard disk designed to replace the customary hard disk. The chipDISK™ is an example of a flash memory technology selected to ruggedize the controller 27 for use outside of a laboratory environment. Advantageously, flash memory is insensitive to tremors, vibrations, impacts, fluctuations in temperature and magnetic fields. Flash memory is, therefore, well-suited for use in mobile equipment and systems which need to withstand severe influences. Additionally, having a very small form factor, the flash memory allows the configuration of a more compact and therefore portable controller 27.

The remaining infrastructure necessary to support the controller network includes a transmitter card 51, along with a power amplifier board 48, and the power supply section 54.

The power supply section 54 feeds the network controller 45, the power amplifier board 48, the transmitter card 51, and the non-volatile memory 52. The power supply board 54 feeding a logical power supply 5-volt regulator 57 provides power for logical switching circuits. In the non-limiting embodiment, the described elements of the controller 27 function as the principal server in the networked sonar transducer array 7.

At least one transducer electronics subassembly 12 is in networked communication with the controller 27. The transducer electronics subassembly 12 includes a transducer processor 30, itself including, by way of non-limiting example, network transmission 33 and reception boards 36 to enable communication through the network bus 24, as well as a transducer 39. The transducer processor 30 is further configured to drive a transducer 39 and to process the signals from the transducer 39 to create transducer data to be fed over the network bus 24 to the controller 27. In one embodiment, the controller 27 time stamps transducer data and concatenates the time stamped transducer data with data including azimuth angle and angle of depression data.

The transducer 39 generates and receives sonar energy by means of piezoelectric ceramics. A variety of piezoelectric ceramics may be suitable for the fabrication of the transducer 39. Often ceramic formulations are chosen to optimize a "Q factor," a term used to describe a measure of "quality" of a resonant system. Resonant systems respond to frequencies close to their natural frequency much more strongly than to other frequencies. Systems with a high Q factor resonate with greater amplitude at the resonant frequencies than systems with a low Q factor. Enhancing the Q factor of the ceramic assures that reception of sonic energy within the band used for ranging will make the transducer both more sensitive and more discerning. A lower Q factor allows the piezoelectric ceramic transducer makes the transducer responsive to a wider range of frequencies. In some embodiments lower Q factors will facilitate a desired response, in others, a higher Q allows for dedicated use at a particular frequency. Alternatively, where a plurality of frequencies is desired, the single transducer electronics subassembly 12 may, optionally, contain multiple transmitters and receivers for each receiver transmitter pair being configured to operate at different frequencies.

Transducers 39 can operate as both transmitters and receivers, or they can be configured to be either solely transmitters or solely receivers depending upon electronics supporting the piezoelectric ceramic. Where a sonar installation includes a distinct transmitter and a distinct receiver, a shared timing signal is necessary to measure transit time for a ping traveling between the transmitter and receiver through a medium such as seawater. Time stamping pings at the receiver after generating pings at known times provides a calculable transit time.

One advantage of a networked sonar transducer array 7 is that each component of the transducer array operates with access to a network time signal that, advantageously can also be used to time components of the sonar transducer array 7. That network time signal can be used to clock acoustical emissions and receptions at distinct transducers 39, allowing operation analogous to that of bistatic radar. In bistatic operation, a single emitter transducer 39 can ping a plurality of targets within the monitored seabed environments 101 and the ping can be reflected and subsequently received at a number of distinct directional receiver transducers 39.

Piezoelectric ceramics exploited as transducers 39 may be optionally configured for specific transmission or reception tasks. For instance, where a desired function of a one of the networked transducers 39 is to serve as a "trip wire," the piezoelectric ceramic might be configured to be horizontally omnidirectional, i.e. having a beam pattern that is virtually equal in all horizontal directions. By transmitting a single ping that is, in turn, heard by a number of placed receivers, changes in a seabed environment 101 may be noted and localized. In that fashion, detection of movement within the broad scope monitored by the several receiving transducers can serve to initiate further probing action. The controller 27, in response to the detected movement, directs the distinct transducer assemblies 12 to derive further information from the area in the seabed environment 101 where the movement was detected.

The ability to craft distinct configurations of piezoelectric ceramics is particularly exploitable in the context of networked sonar transducer array 7. By selectively fabricating transducers 39 for distinct capabilities and configuring the placement of the transducers within a monitored submarine environment 101 to exploit the selected characteristics of the fabricated transducers 39, coverage of the seabed may be tailored for optimal detection of change within the seabed environment 101. A networked sonar transducer array 7 may include narrow-beam, split-beam, side-scan and wide-beam transducers selected for the particular assignment within the seabed environment 101. For instance, sidescan transducers 39 are designed for a focused directional beam pattern to the side and may be advantageously exploited to monitor elongate margins of the designated seabed environment 101.

In a further embodiment, several transducers 39 are ganged as an array within a single transducer electronics assembly 12, allowing the transducer processor 30 to switchably address any one of the several transducers 39 arranged together as a system. By doing so, the transducer electronic subassembly 12, as a system, can change its focus on the seabed as the controller 27 dictates. An analogous situation is presented by the user of bi- or tri-focal glasses. As needed to observe an object of interest, the user selects the lens that will yield the most information to the user, generally by casting the eyes to see through the selected lens.

Similarly, the single transducer electronics subassembly 12 can be selectively configured to activate distinct piezoelectric ceramics 39 without physical replacement but rather by switching that selectively includes one or another piezoelectric ceramic 39, according to the sonar configuration designed for the seabed, thereby removing the expense associated with placement of multiply and distinctly packaged electronics subassemblies 12 for each intended focus. In such non-limiting exemplary embodiments, the transducer processor 30 is selected to included the ability to switch between the several transducers 39 according to direction from the controller 27.

As explained above, the transducer electronics subassembly 12 may advantageously communicate between the controller and the several distinct transducers by means of one or several network interface cards 33, 36. As earlier indicated in the discussion of FIG. 1, a second network interface card optionally might be dedicated to receiving information from the environmental condition sensor 18 (FIG. 1) and conveying it from the transducer processor 30 to the controller 27, in one of several embodiments. Alternately, the transducer processor 30 may perform normalization of the received echo timings based upon observed environmental conditions.

Figure 3:
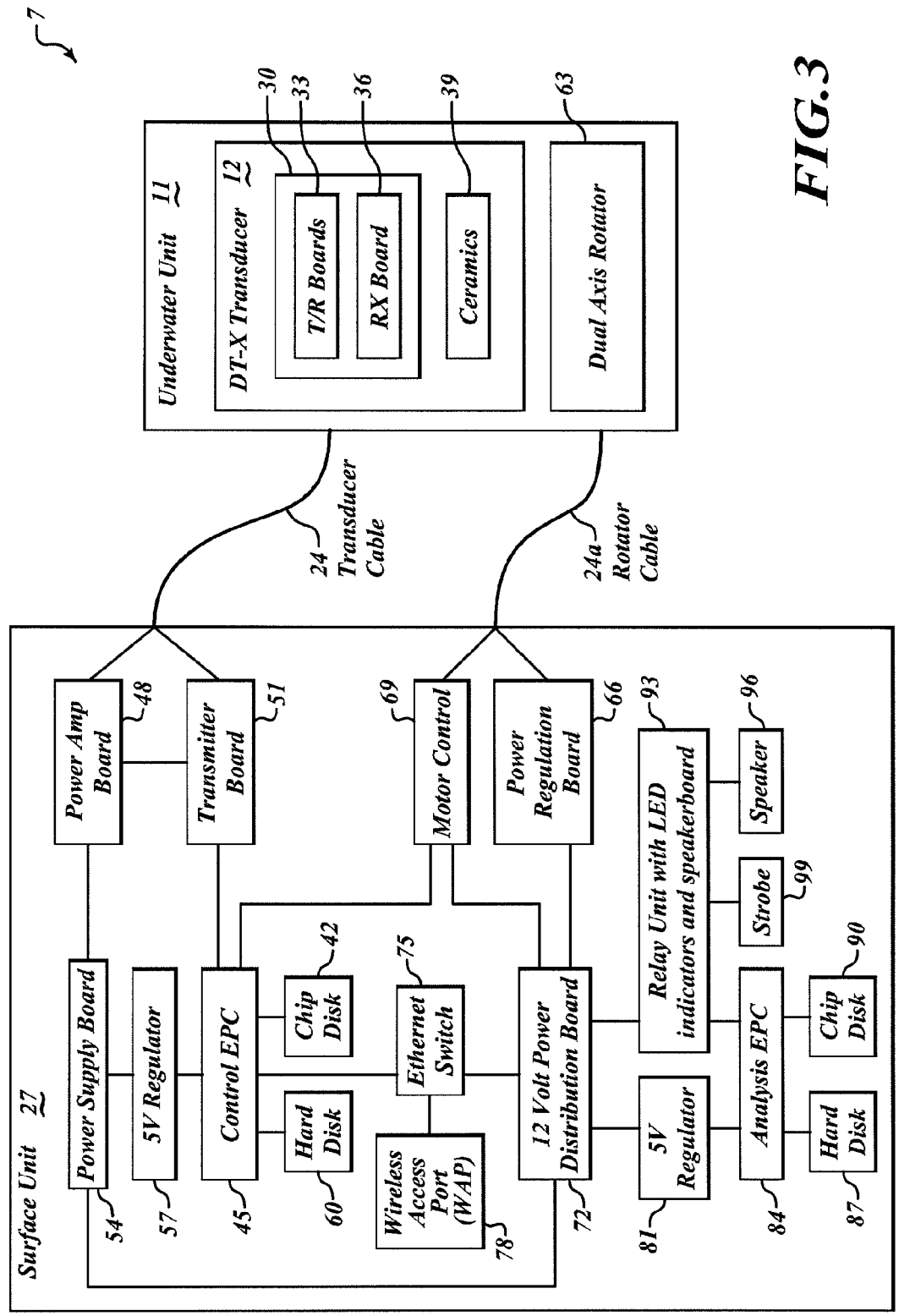
FIG. 3 is a detailed block diagram of the networked sonar array with the single transducer assembly.

Referring now to FIG. 3, the networked sonar transducer array 7 is shown to include the several data and signal processing capabilities necessary to more fully exploit the data gathering capabilities of the networked sonar transducer array 7. It should be noted that for the sake of discussion, the dual functions of the controller 27 and a number of physical elements it comprises are duplicated in FIG. 3. This alternate embodiment does not require distinct elements but rather illustrates that the function of providing 5 volt regulation might be handled by a single 5 volt regulator even though two distinct 5 volt regulators 57, 81 are shown in the diagram. Similarly, the network bus 24 and a rotator cable 24*a*; the hard disk 60, 87; the non-volatile memory 42, 90; and the processor 45, 84 are each shown as distinct elements but any or all of them may, in the prudent practice of the invention, be embodied by a single physical unit.

The heart of the controller 27 is the processor 84. The processor receives data from a plurality of the transducer electronics subassemblies 12 and sorts the data to give a comprehensive picture of the monitored seabed. The processor 84 tasks each of the transducer electronics subassemblies 12 to specifically monitor an assigned sector according to instructions transmitted to the assembly through the transmitter board 51 over the network bus 24 to the receiver network interface board 36 to selectably select a transducer 39 to specifically observe regions within the seabed. The Ethernet switch 75 suitably correlates data according to its source in order to facilitate addressed communication within the network 24, identifying both the source and the destination of data. Data generally streams to the processor 84 from the transducers 39 and commands flow down to the transducers 39. By such means, the identify data is associated with its source transducer electronics subassembly 12.

In an alternate embodiment, instructions for the processor 84 reside in a machine readable form on the non-volatile memory 90. The processor 84 receives the data from the transducer 39 and builds a picture in a buffer corresponding to the transducer 39 on the hard drive 87. To the extent necessary to observe a particular region based upon an orientation of the two-axis mount 15 (FIG. 1), the processor 84 generates instructions to suitably orient the transducer 39 relative to the mount 15. The processor 84 generates drive instructions and sends them through the motor control 69 down the rotator cable 24*a*. The drive instructions are received within the transducer electronics subassembly 12 at the dual axis rotator 63. The dual axis rotator 63 suitably activate the mount 15 and its attendant actuators to orient the transducer 39 while the potentiometers (not shown) sense pan and tilt orientation angles. The azimuth and depression angles that the dual axis rotator 63 communicates back to the processor 84 then confirm the alignment of the transducer 39.

The processor 84 populates the several buffers on the hard disk 87 to produce complete pictures of the monitored seabed from each of the plurality of transducer electronics subassemblies 12. The processor 84 further compares the data received to determine if some aspect of the data matches any of a number of alarm states recorded in the instructions stored in machine readable form on the non-volatile memory 90. If the data matches one of the alarm state, the processor 84 feeds suitable instructions to the relay unit 93 which suitably activates either or both of a strobe 99 or a speaker 96 with an annunciated warning according to the particular alarm state.

Benchmarks in Seabed

Advantageously, in most instances where a submarine environment 101 is to be monitored, detailed bathymetric data exists to reveal the contour and significant features of the submarine landscape. From a vessel, raw sonar data is collected using the sonar sensors. To calculate the precise position of the vessel, a computer constantly monitors the vessel's position according to a GPS system. Heave, pitch and roll data from the vessel's motion sensor and tide information from the tide gauge are input to condition and normalize the data. The large quantities of data returned from the site survey (typically hundreds of megabytes) are processed to provide a high resolution digital terrain map (DTM) with a typical positional resolution of 5-10 centimeters and a depth resolution of 1 centimeter in one non-limiting example. The DTMs are rendered using seabed visualization software.

Sonar technology is not the only method of gathering seabed topography. Underwater photography or video can provide the most detailed view of the seafloor. However, the cameras are limited to short distances as the artificial light does not penetrate the seawater effectively. In some cases visibility is degraded due to disturbed sediment and other environmental factors. Cameras placed on a remotely operated vehicle (ROV) can be used to gather data to augment the data resulting from rendering.

Satellite technology is another method that can be used to map the seafloor since, due to gravity, the shape of the sea surface is closely related to that of the seafloor. The depth of the ocean can vary by approximately 200 meters solely from the gravitational pull of large underwater seamounds such as an underwater volcano. Conversely, the ocean surface can downwarp over seabed trenches. Satellites measure the time it takes to bounce radio waves off the surface of the ocean and therefore calculate the height of the sea surface. Ocean topography using satellites can provide a global view of the ocean floor but generally lack the precision provided by sonar. When the several data collection methods are used in conjunction, one with the others, a very accurate rendering of the seabed is derived from the surface elevations.

Figure 4A:
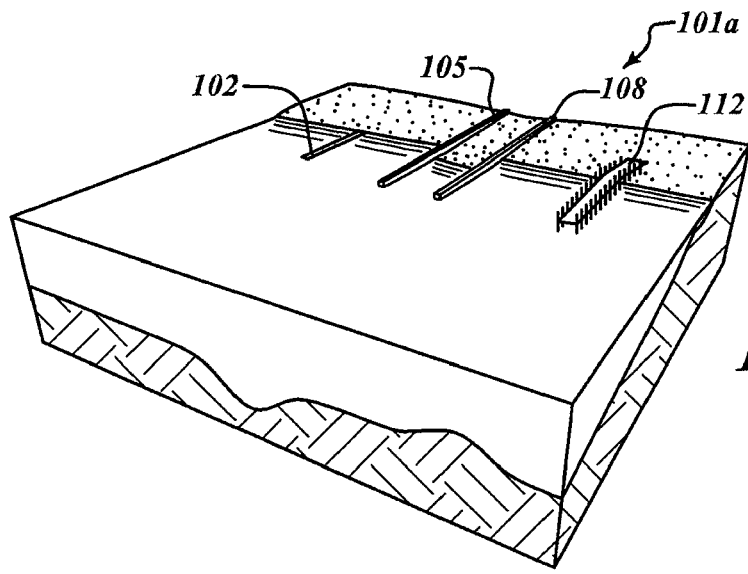
FIG. 4a is a seabed environment including surf zone bathymetry factors.

Based upon an accurate and detailed view of the seabed, a networked sonar transducer array is designed to sense the seabed and the submarine environment 101 above the seabed. Referring to FIG. 4*a*, the surf zone seabed 101*a* is portrayed with seawater present and as having several notable shoreline features, such as a groin 102, opposing jetties 105 and 108 and a pier 112. Not themselves seabed features, these marine features are indicative of corresponding submarine features that will make up the fixed seabed.

Figure 4B:
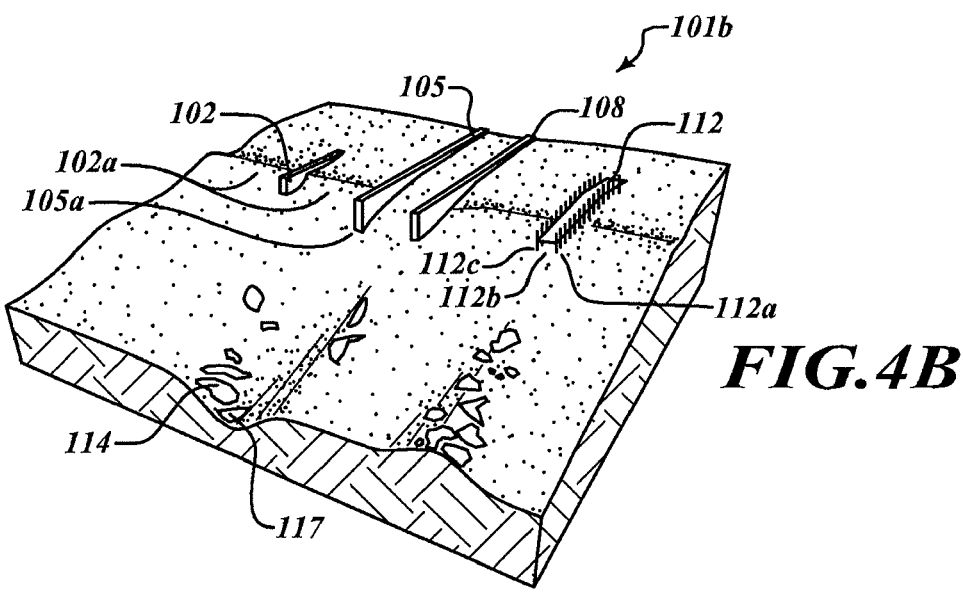
FIG. 4b is a seabed environment with the seawater removed to reveal surf zone bathymetry factors.

Referring to FIG. 4*b*, the bathymetric features such as the sandbars 102*a* encompassing the groin 102, the footings 105*a* of the jetty 105, and the pilings 112*a*, 112*b*, and 112*c* become evident, as do other features such as canyon rocks 114, 117. These submarine features represent irregularities in the seabed; they are fixed, and observation of the seabed by sonar means will repeatedly produce echoes indicative of these fixed features of the seabed. Once known, display or analysis of these features is redundant and uninteresting for purposes of monitoring the seabed environment 101, but are extremely important in a process of placing transducer assemblies 10 (FIG. 1) in the networked sonar transducer array 7 (FIG. 2*a*) within the seabed environment 101.

Given the fixed nature of the several submarine features, the data obtained by the sonar survey is used to establish a baseline of ambient noise and reverberation, and fixed and assumed uninteresting physical targets, which may be present in the field of view. The processor 84 is programmed to "map" these features into memory. Any number of features are mapped into memory given their fixed and repeatable nature. Examples of these features include pilings, ship hulls, sea walls, aquatic vegetation and the seafloor itself.

Once the submarine terrain is known and the features isolated, the transducer assemblies 10 (FIG. 1) of the networked sonar transducer array 7 (FIG. 2*a*) are placed within the submarine environment 101. As indicated above, a transducer emits in a solid angle cone. Efficiently packing the submarine environment 101 with solid angle cones is readily accomplished by space packing algorithms and aided by the criteria that overlap of cones allow placement of the transducers 39

(FIG. 2b) to suitably overlap downrange. Due consideration is taken of placement of sensor to assure visualization of each of the features within the seabed environment 101. For instance, the seabed terrain includes two canyon rocks 114, 117. As the rocks 114 and 117 rest within a seabed canyon, placement of the transducer 39 (FIG. 2b) will duly exploit alignment of the cone with the canyon to allow a clear "view" of the canyon rocks 114, 117 from the selected transducer site (not shown).

Once transducers 39 (FIG. 2b) are placed, the background collection phase begins with a scan of the seabed environment 101. Scanning includes "pinging" or generating "pings" which are short pulses of sound energy generated to propagate from the transducer 39 (FIG. 2b) through the submarine seabed environment 101 and used for ranging. Scanning is pinging while the transducer 39 (FIG. 2b) resides in a variety of orientations to build a composite of the submarine seabed environment 101 as the transducer 39 receives reflected pings.

When the networked sonar transducer array 7 performs the scan of a particular sector of seabed environment 101 the two-axis mount 15 (FIG. 1) drives each transducer to many different orientations during the course of the scan. Additionally, transducers 39 are optionally placed within the seabed environment 101 in a configuration to assure that each feature in the seabed environment 101 is viewed by at least one transducer 39. At any particular orientation, an emitted ping will encounter certain static structures present in the environment 101, for example, pilings or the bottom. The background collection phase consists of collecting acoustic data while scanning the transducer through the entire path of the scan. Ideally, the background collection phase is run long enough for several pings to be collected for each bin of orientations (for example, each 1-degree cone). The size of the orientation bins is configurable by the user.

Bistatic imaging may also optionally be used in a similar fashion to generate further data as to the nature of the seabed environment 101. Bistatic imaging is a technique for using two transducers 39 (FIG. 2b) to map a surface, with one emitting and one receiving. The bistatic imaging yields a more detailed image than would have been rendered with just the transducer 39 (FIG. 2b). Bistatic imaging can be useful in differentiating between different sonary surfaces, due to the different ways that sound reflects off of these objects (transducers detect "volume scattering" from less solid surfaces). Additionally, bistatic imaging allows for monitoring spaces between two transducers 39 (FIG. 2b).

Epipolar geometry is the intrinsic projective geometry between two views. Resolution of the spatial relations between selected points is independent of scene structure, and only depends on the transducers' 39 (FIG. 2b) internal parameters and relative pose. The epipolar geometry between two views is essentially the geometry of the intersection of the image planes with the pencil of planes having the baseline as axis (the baseline is the line joining the transducers 39 (FIG. 2b) centers). Resolving spatial relations is based upon epipolar geometry to assist in the search for corresponding points in stereo matching.

At the end of the background collection process, the pings in each orientation bin are averaged to get a representation of the static structure encountered by the acoustic beam when it is in that orientation. The scan can suitably be correlated with the results of the initial sonar survey of the seabed environment 101.

Figure 4C:
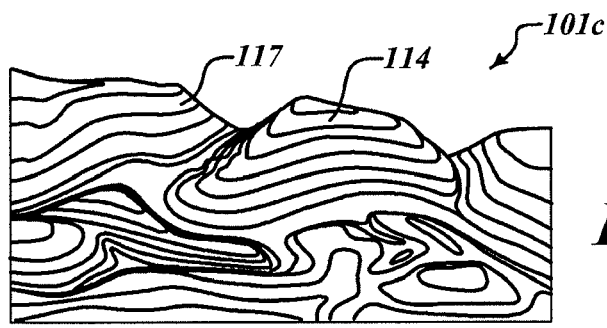
FIG. 4c is a detail of two rocks within the seabed environment.

Referring to FIG. 4c, the hard features in the seabed environment 101 such as the canyon rocks 114, 117. Such known submarine terrain features are compared to the timings of the received pings in order to solve for a transform from one mapping by one transducer 39 (FIG. 2b) to the next. Kalman filtering is optionally used to solve for such a transformation relative to the monitored seabed environment 101. Because the solution of the transformation need not be done in "real time" iterative processing of the Kalman filter can be used until the spherical coordinates generated at a first transducer 39 (FIG. 2b) of returned pings from its surrounding environment 101 can be used to relate the returns from the first transducer 39 (FIG. 2b) to those of a second transducer 39 (FIG. 2b). Once a solution is derived between each of the transducers 39 (FIG. 2b) and each of the remaining transducers 39 (FIG. 2b), the whole of the seabed environment 101 can be described in spherical coordinates from at least one, but generally two transducers 39 (FIG. 2b) in the seabed environment 101.

Spatial Model

Once the whole of the seabed environment 101 is mapped relative to each of the transducers 39 (FIG. 2b), monitoring of the seabed environment 101 is more readily achieved. The seabed features that are static, having already been used to solve for the suitably transforms between the coordinates as "viewed" from each of the transducers 39 (FIG. 2b), now become the boundaries of relevant returns. For purposes of monitoring the environment 101, no reason exists to expend computer resources for resolving range bins outside of the boundaries defined by the static features. The boundaries of relevant returns are then mapped to form a by-pass map uses for suppression selection.

Figure 5:
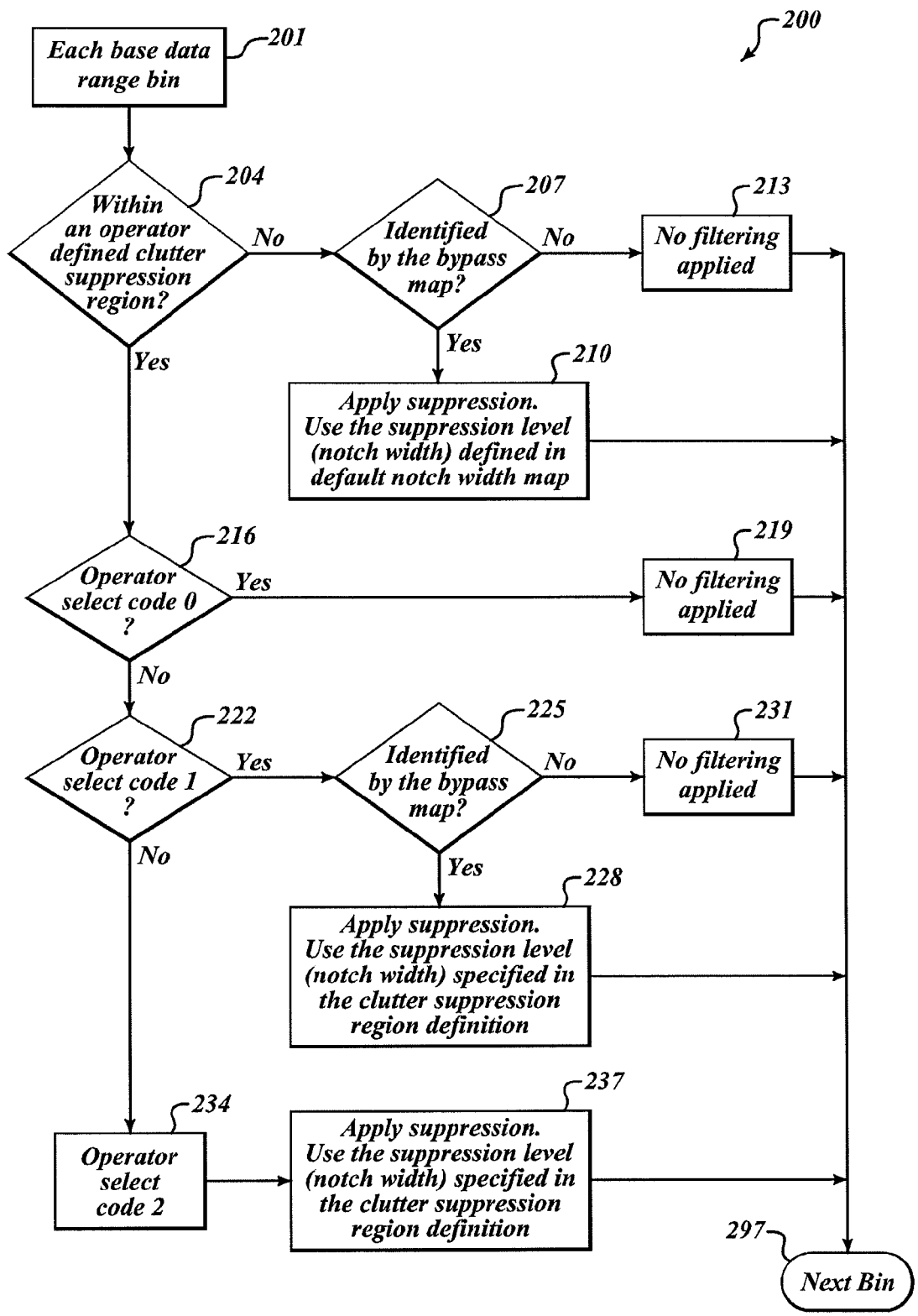
FIG. 5 is a flow chart of analysis of the suppression algorithm.

Referring to FIG. 5, a filtering method 200 includes examining each range bin for suppression according the by-pass map. Commencing at a block 201, the method continues to determine if the range bin is spatially located within an area where suppression is advantageous at a block 204. Most of the range of any of the transducers 39 (FIG. 2b) includes monitorable space; indeed, the placement of the transducers 39 (FIG. 2b) was based upon optimizing the portion of the seabed environs each of the transducers 39 (FIG. 2b) could monitor. In some instances, activity with a region is known and not considered advantageous to monitor. By way of non-limiting example, when a vessel passes through an area being monitored for cetacean activity, the vessel is know an in order to well track what activity exists around the vessel, suppression of returns from the vessel prevents those returns from overwhelming the other information discernible in proximity to the vessel. Because the vessel would not be on the by-pass map, it not being a static feature of the seabed environs, an option allowing the operator to suppress the returns at the vessel is useful.

If the range bins are outside of the operator defined area for ad hoc suppression, the method proceeds checking if the range bin is one identified by the by-pass map for suppression at a block 207. If not, the range bin is stored unaltered in the buffer at a block 213 and at a block 297, the analysis proceeds to the next range bin in question.

If, at the block 207 the range bin is found on the by-pass map, at a block 210, the returns in the range bin are suppressed according to the filter information stored in the by-pass map. Once the returns are suitably suppressed, the returns are stored in the buffer, and at the block 297, the analysis proceeds to the next range bin in question.

Where there are no objects that require operator selected local suppression, an operator will select a setting of "0" meaning "no local suppression is requested" and thus, at a block 216, the method determines that no suppression is requested and the method, at a block 219, stores the unaltered range bin in the buffer and then at the block 297, moves to the next range bin.

If, on the other hand, the operator has selected either of settings "1" or "2" meaning that either of "selective suppression" "suppression according to suppression map," respectively, are selected, at the block 216, the method moves to determine suitable suppression.

A word about the suppression map is appropriate. In this non-limiting example, the suppression map is a map of filter values selected based upon the seabed terrain and the operator's "tuning" of results to achieve appropriate sensitivity throughout the range. The suppression map is a result of the operator's experience and not based upon autonomous responses of the system.

In the selective suppression mode or operator selected "1" mode, the by-pass map and the suppression map are selectable but deference is given to the by-pass map. If the operator selected is detected at a block 222, the method queries the by-pass map to determine if a by-pass filtering value is associated with the location of the range-bin under analysis, at a block 225. If no by-pass map entry exists, at a block 231, the range bin value is stored in the buffer and at the block 297, the analysis moves to the next range bin.

If a value exists on the by-pass map associated with the spatial location of the range bin, the value is suppressed according at a block 228 and stored in the buffer. Then, the method moves to the next range bin for analysis at the block 297.

Where the operator has selected mode "2" only the suppression map is applied to the range bin returns. Thus, at a block 234, the selection of mode "2" is verified. At a block 237, the suppression stored in association with the range bin spatial location is applied to the range bin return and at the block 297, the analysis moves to the next range bin.

Non-Limiting Example of Use of the Networked Sonar Transducer Array

Figure 6:
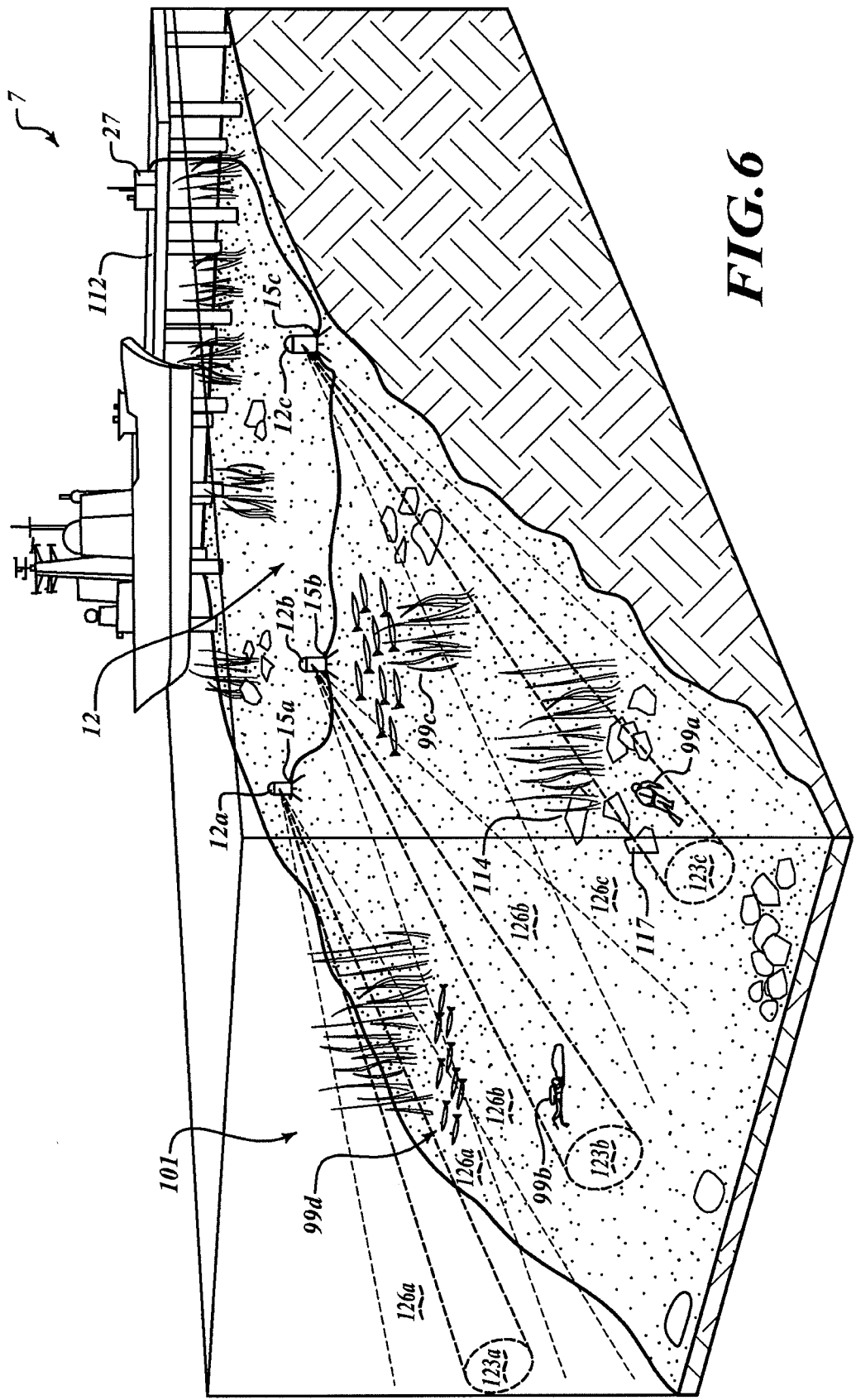
FIG. 6 is a perspective view of a seabed environment with a networked sonar array in situ.

Referring to FIG. 6, an example drawn from a test of the system is illuminating. In an underwater environment 101 a number of existing hard targets such as canyon rocks 114, 117 exist as part of the static members of the environment 101. For the purposes of this non-limiting example, these are presumed to be already mapped relative to each of the several (in this exemplary case, three) transducer subassemblies 12a, 12b, 12c on their respective two-axis mounts 15a, 15b, 15c configured as a network of transducer subassemblies 12. In this non-limiting example, each of the transducer assemblies have a narrow-angle cone 123a, 123b, and 123c systematically scanning a defined azimuth 126a, 126b, 126c, and for surveillance of the underwater environment 101. In response to commands generated either autonomously or sent to the transducer assembly network 12 for an individual transducer assembly, 12b for example, from the controller 27, the transducer assemblies may switchably select scanning the azimuth 126 in a systematic pattern or training narrow-angle cones 123 for surveillance of designated point in the underwater environment 101.

Presumed in this example is that the whole of the underwater environment 101 is suitably mapped by the above-described methods relative to each of the transducer subassemblies 12a, 12b, 12c and by means of epipolar geometry all of the spatial relationships between the terrain including hard targets within the underwater environment 101 have been suitably related to each of the transducer assemblies 12a, 12b, 12c to generate a three-dimensional buffer representing the space.

As the networked sonar transducer array 7 monitors the underwater environment 101 for movement within the underwater environment 101, all echoes that would emanate from the known static elements such as the canyon rocks 114, 117 are, in at least one embodiment, suppressed from analysis or, optionally, from a graphic display of the space generated for operators, as these static elements are known not to be migrating fish or other targets 99 of interest within the environment 101. Thus, where some dynamic element within the environment 101, initiates a movement that is detectable by at least one of the arrayed transducer assemblies 12a, 12b, 12c, that movement may be tracked relatively easily independently of the echoes emanating from known static elements within the environment 101.

In at least one embodiment, alarming based upon movement within the environment 101 is considered to be very useful. For instance, where the selected underwater environment 101 is at a choke-point in a migratory pattern, and where the sort of echoes that might be returned from dynamic elements in the space are known by certain characteristics, movement of such dynamic elements may, itself, be an event of note, signaling, for example, the return of such a long migratory as an Orca to a territorial water. If "enough" such echoes are received at the transducer assemblies 12 (based on a user-configurable sensitivity parameter), then an alarm condition is signaled. The actual signaling may be designated to take the form of triggering relays connected to alarm devices such as a siren or a strobe light, or it may include sending out information over a second network (distinct from the arrayed transducer assemblies 12) about the position of the dynamic element. Optionally, alarming includes generating a displayed icon at a position correlating with the position of the dynamic element within the environment 101. Such an icon might be placed in a three-dimensioned representation of the environment 101 or in the more traditional plan position indicator (PPI) display used in radar applications.

To test the efficacy of the networked sonar transducer array 7, targets are introduced into the underwater environment 101. One exemplary target, a diver 99a presents a minimal profile to the transducer assembly 12c as the diver 99a swims within the wide-angle cone 126c. Alerted to the changing state within the ambit of the wide-angle cone 126c, either autonomously or at the command of the controller 27, the transducer assembly 12c switches from systematically scanning the azimuth 126c to training the narrow-angle cone 123c to enable examining the diver 99a with the greater discernment that repeated pinging with the narrow-angle cone 123c provides. Optionally, the controller 27, may order the adjacent transducer assembly 12b to pivot on its two-axis mount 15b to further examine the diver 99a. Generally the narrow-angle cone 123b can be trained on the diver 99a given the epipolar geometric solution already solved for the whole of the underwater environment 101. Advantageously, the diver 99a cannot present the minimal cross-section to both transducer assemblies 12b, 12c. For this reason, probability of discernment of the diver 99a as a target of interest is greatly enhanced by the simultaneous sensing of the diver by the distinct transducer assemblies 12b, 12c.

In a second instance, the same non-limiting example of the transducer assembly network 12 includes a diver 99b using a diver propulsion vehicle such as a tow behind scooter. Diver propulsion vehicles are used in testing to give distinct velocities and movement to the target. Similarly, the response from the system by way of non-limiting example is the same, except to the extent that the transducer assembly 12b is implicated as monitoring the test area within the underwater environment 101. As a distinct example, the transducer assembly 12b switches from scanning the azimuth 126b to training the narrow-angle cone 123 on the diver 99b to track the diver 99b, while the adjacent transducers 12a and 12c pivot on their respective mounts 15a, 15c to expand their respective azimuths 126a, 126c to include portions of the azimuth 126b that had been monitored by transducer assembly 12b thereby maintaining suitable surveillance of a perimeter of the underwater environment 101.

Having the transducer assemblies 12a, 12b, and 12c, each themselves being trainable in response to the controller 27, the networked sonar array 7 can suitably study any movement of a dynamic element within the underwater environment 101. Another non-limiting example of a response to movement of dynamic elements with the underwater environment 101 is presented by the presence of a school of fish 99c within the underwater environment 101.

Movement of fish 99c through an underwater environment 101 is generally by known means. Fish will travel at known velocities, school in generally known fashions, and present a reflectivity to sonar that can be predicted. From species to species, these parameters may vary, but within a known species, study and cataloging will allow classification of schools of fish or other marine life according to its species and number. Doing so, however, will not be the result of one or two "pings" from a transducer assembly 12b but rather the collection of observed echoes over a period of time. To collect such information, one transducer must be trained on the school while others in the networked sonar array 7 can be retasked in response to the controller 27, the networked sonar array to observe movement of a dynamic elements within the underwater environment 101. In this fashion, the focus of the networked array can be both on individual "trees" while maintaining an eye or rather an ear on the "forest."

In a fourth non-limiting example, if the species of interest is cetacean, biological species even in schools will not be sufficiently reflective as to be of interest. A whale has mass and volume that presents a large and reflective target to sonar. A school of fish such as anchovy 99d will not reflect sonar energy in the manner of whale. Whales have a relatively unvarying volume, well-defined margins, and a greater reflectivity than do a school of anchovy 99d. Whales do not dart from one position within the underwater environment 101 to a second position. Where for the purposes of studying whale movement, the networked sonar array can identify the school of anchovies 99d as anchovies, the most prudent deployment of resources may simply be to filter out returns from the school of anchovies 99d and to continue to allow each of the transducer assemblies 12a, 12b, and 12c to continue to monitor their respective azimuths 126a, 126b, and 126c. Using such a non-limiting exemplary strategy allows maximum discernment of desired targets 99 within the underwater environment 101 by sacrificing knowledge of the exact movement of non-interesting targets within the underwater environment 101.

While several strategies have been shown to describe the capabilities of the networked sonar array 7, the purpose of the description is not to limit the networked sonar array to a number of taught responses to targets 99 within the underwater environment 101, but rather to indicate the flexibility of the networked sonar array 7 in response to targets of various interest within the underwater environment 101. Capabilities of the array 7 are the object of the teaching in this non-limiting disclosure and strategies may vary in accord with the intended subject of study. That the individual transducer assemblies 12a, 12b, and 12c are not required to observe fixed and unvaried azimuths 126a, 126b, and 126c results from the independent training of the transducer assemblies 12a, 12b, and 12c responsive to signals received from the controller 27.

Picket Configuration

One virtue of the networked sonar array is that the selection and tasking of transducer assemblies 12 may be according to the underwater environment 101 to be observed. Where, for instance, the underwater topography includes some of the features discussed in relation to FIGS. 4a and 4b above, selecting and positioning transducer assemblies 12 might well be accomplished through the selection of specialized transducers.

By way of explanation, the non-limiting example of a volume of the underwater environment 101 positioned between two piers might be a focus of study, especially, where as in this non-limiting example, pilings are spaced such that whales may only enter and leave the volume by passing between two extreme ends of the pair of piers.

Figure 7:
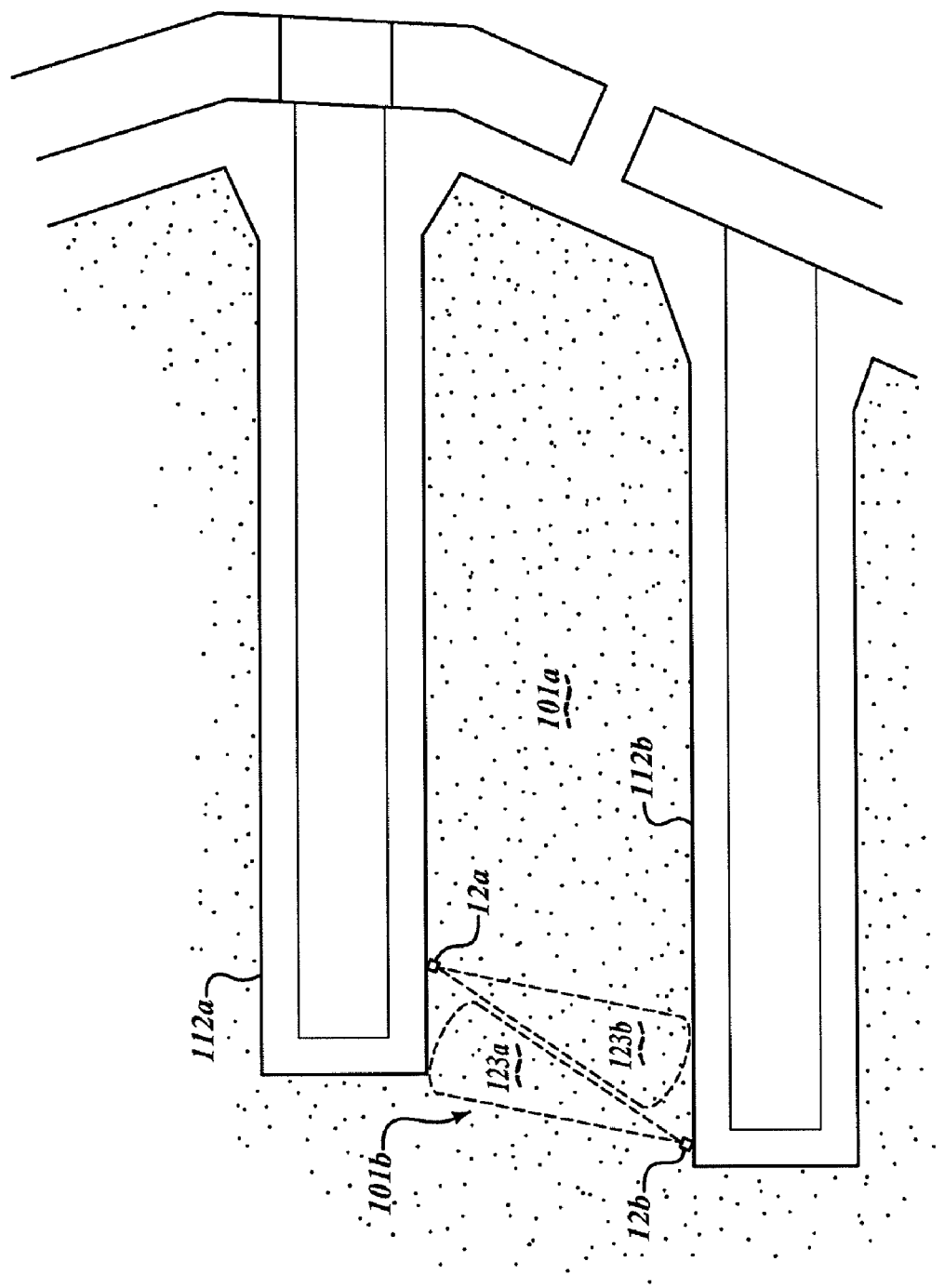
FIG. 7 is a plan view of a constricted seabed volume between piers.

Referring to FIG. 7, a first pier 112a is parallel and spaced apart from a second pier 112b and encompassing an underwater volume 101a. A second view from within the underwater volume 101a looking through the mouth 101b is presented in FIG. 8. At corresponding extreme ends of the piers respective transducer assemblies 12a and 12b are trained to provide a picket that covers a gateway or mouth 101b to the underwater volume 101a.

Figure 8:
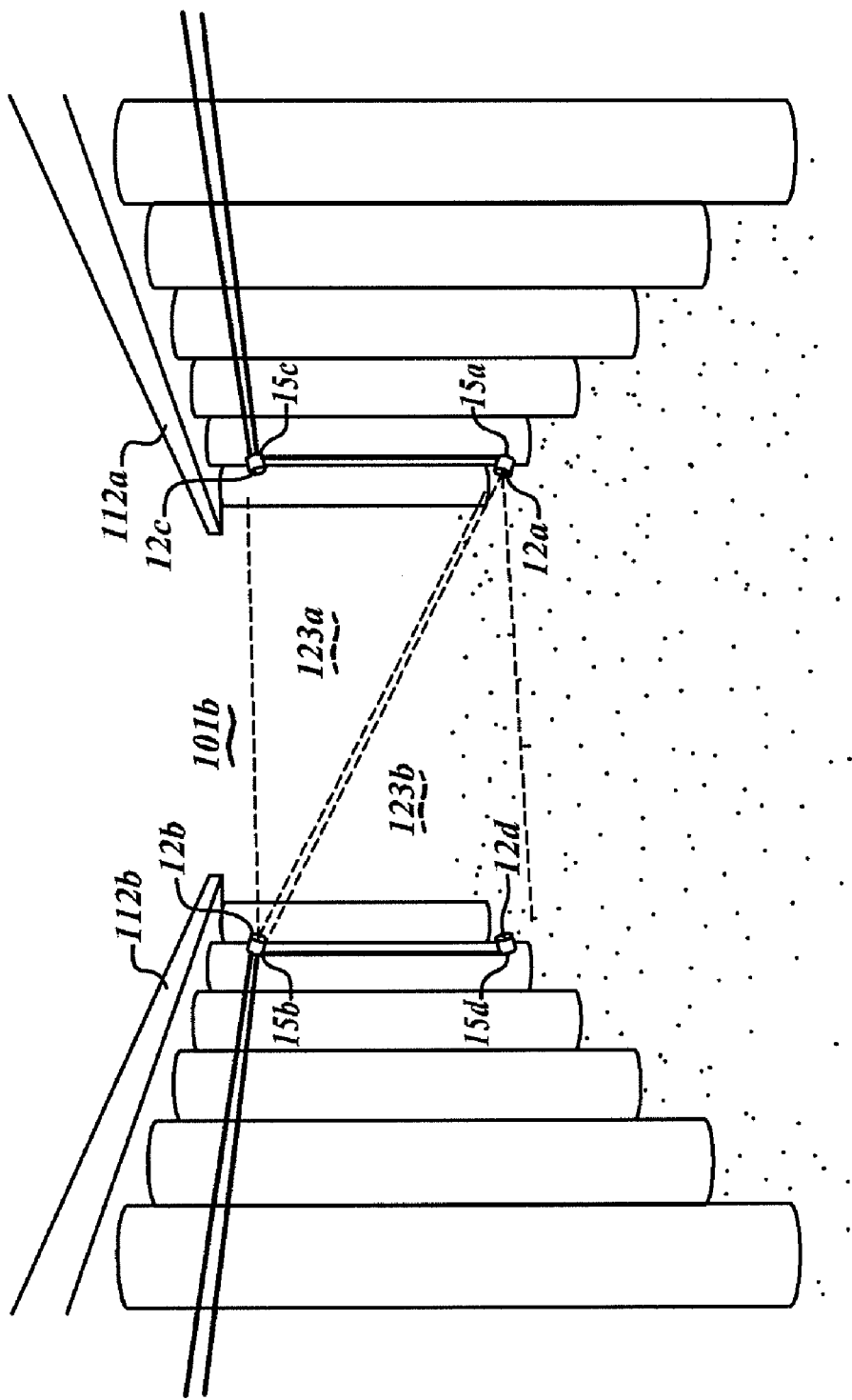
FIG. 8 is a perspective view of the seabed volume between piers.

Referring to FIGS. 7 and 8, the transducer assemblies 12a and 12b are selected to be wide-angle transducer assemblies, that is to say transducer assemblies having wide-angle cones 123a and 123b respectively. Once mounted on the respective piers 112a and 112b respectively, the transducer assemblies 12a and 12b are trained to assure that the wide-angle cones 123a and 123b generally occlude the mouth 101b with minimal overlap. Frequencies for the transducers are selected to generate optimal responses from the environment (for instance to penetrate silt of plankton known to be present). The operator may also select an optimal number of range bins within each of the cones 123a and 123b.

Placement of the transducer assemblies 12a and 12b in this "picket" formation completely filling the mouth 101b of the volume 101a, monitors movement into the volume without requiring that all of the volume 101a be constantly monitored. Thus, for example where an activity such as spawning may occur within the area but such spawning need not itself be observed, the perimeter picket yields all of the information of note. Where additional information is necessary, two transducer assemblies 12c and 12d are mounted but not activated or trained until the need arises or at such time when the controller 27 (FIG. 6) generates orders to "exercise" the two-axis mounts 15c, 15d.

Additionally, the non-limiting deployment of the transducer assemblies 12a, 12b, 12c, and 12d on their respective two-axis mounts 15a, 15b, 15c, and 15d allows for redundancy in guarding the mouth 101b. Alternately, the transducer assemblies 12a and 12b, can be placed in the secondary job of tracing targets of interest by the controller 27 (FIG. 6) while then using the transducer assemblies 12c and 12d to provide the picket in a symmetric fashion to that illustrated in FIG. 8.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A sonar transducer network for observing a seabed comprising:
    a controller to generate a network time datum;
    a first transducer assembly including
        a first transducer to convert a first ping at a first ping time to a first electrical signal; and
        a first transducer processor to receive a first electrical signal from the first transducer to generate the first transducer data, the first transducer data including a first ping time datum;
    at least one second transducer assembly, spaced apart from the first transducer assembly, the second transducer assembly including:
        a second transducer to convert a second ping to a second electrical signal; and
        a second transducer processor to receive the second electrical signal from the second transducer to generate second transducer data, the second transducer data including a second ping time datum; and
    a network bus to communicate first transducer data and second transducer data with the controller, the controller to timestamp the first transducer data to include the first ping time according to the network time datum and the second transducer data to include the second ping time according to the network time datum.

2. The sonar transducer network of claim 1, wherein:
the network bus includes:
    a controller network interface communicatively connected to the controller; and
    a first addressable transducer network interface communicatively connected to the first transducer processor;
    at least one second addressable transducer interface communicatively connected to the at least one second transducer processor; and
    a network conduit communicatively connected to each of the controller network interface; the first transducer network interface; and the at least one second transducer interface.

3. The sonar transducer network of claim 2, wherein:
the network interfaces include Ethernet interfaces; and
the network conduit includes an Ethernet cable.

4. The sonar transducer network of claim 3, wherein:
the network interfaces include fiber optic network interfaces; and
the network conduit is a fiber optic conduit.

5. The sonar transducer network of claim 1, wherein:
the transducer processor includes an analog to digital converter in communication with the transducer.

6. The sonar transducer network of claim 1, wherein:
the transducer assembly includes environmental sensors to measure at least one of environmental condition in the seabed proximate to the transducer selected from a group consisting of:
    temperature;
    salinity; and
    relative pressure.

7. The sonar transducer network of claim 6, wherein:
the transducer processor is configured to normalize transducer data based upon the at least one environmental condition.

8. The sonar transducer network of claim 6, wherein:
the transducer processor is configured to communicate the at least one environmental condition to the controller; and
the controller normalizes the transit times based upon the at least one environmental condition.

9. The sonar transducer network of claim 1, wherein:
the first transducer data includes:
    at least one transit time measured at a temporal moment; and
    a timestamp identifying the temporal moment according to the first ping time.

10. The sonar transducer network of claim 9, wherein:
at least one of the transducer assemblies include:
    an at least two-axis mount affixed to the transducer;
    an azimuthal actuator configured to orient the transducer to an azimuth angle responsive to the transducer processor; and
    a depression actuator configured to orient the transducer to a depression angle responsive to the transducer processor.

11. The sonar transducer network of claim 10, wherein:
the transducer datum includes the azimuth angle and the depression angle measured at the temporal moment.

12. The sonar transducer network of claim 11, wherein:
the controller includes:
    a first buffer to store first transducer data according to temporal moment, azimuth angle, and depression angle.

13. The sonar transducer network of claim 12, wherein:
the controller is configured to generate a three-dimensioned model of static elements of the seabed based upon first transducer data.

14. The sonar transducer network of claim 13, wherein:
the controller includes a second buffer to store second transducer data according to temporal moment, azimuth angle, and depression angle; and
the controller is further configured to refine the three-dimensioned model based upon second transducer data.

15. The sonar transducer network of claim 13, wherein:
the controller is further configured to suppress returns from targets based upon a position relative to the static elements of the three-dimensional model.

16. A method of observing seabed comprising:
locating a plurality of benchmarks within the seabed;
generating a network time datum;
positioning a first transducer assembly suitably to generate first transducer data from remotely sensing each of the plurality of benchmarks within the seabed at the first transducer assembly to include a first ping time datum;
positioning at least one second transducer assembly spaced apart from the first transducer assembly suitably to generate at least one second transducer data from remotely sensing each of the plurality of benchmarks within the seabed at the at least one second transducer assembly;
receiving the first and the at least one second transducer data at a controller, the controller to timestamp the first transducer data to include the first ping time according to the network time datum and the second transducer data to include the second ping time according to the network time datum; and
storing first transducer data in a first buffer and the at least one second transducer data in at least one second buffer according to a temporal moment and network time datum, azimuth angle, and depression angle.

17. The method of claim 16, further comprising:
identifying data from each of the plurality of benchmarks in the first buffer as first benchmark data;
identifying data from each of the plurality of benchmarks in the second buffer as second benchmark data; and
correlating first benchmark data with second benchmark data to generate a parallax image of the benchmarks from the first transducer data and the at least one second transducer data.

18. The method of claim 17, further comprising:
generating a digital elevation model of seabed based upon the parallax image, the first transducer data, and the at least one second transducer data.

19. The method of claim 18, wherein the generating on the digital elevation model includes:
mapping a first plurality of first point data in the first transducer data relative to the first transducer assembly to develop a first locus set;
mapping a second plurality of second point data relative to the second transducer assembly to develop a second locus set; and
correlating the first point data to the second point data; and generating a correlated point data.

20. The method of claim 19, further comprising:
modeling the correlated point data to generate a three-dimensioned model of the seabed.

21. The method of claim 18, wherein:
generating the digital elevation model includes:
mapping the first plurality of first point data relative to the first transducer assembly based upon a selected temporal moment; and
mapping a second plurality of second point data relative to the second transducer to develop a second locus set based upon the temporal moment.

22. The method of claim 21, wherein:
generating the digital elevation model includes:
selecting a temporal interval to include a substantially continuous plurality of temporal moments.

23. The method of claim 17, wherein the parallax image includes:
static elements remaining substantially unchanged over time within a temporal interval; and
dynamic elements varying over time within the temporal interval.

24. The method of claim 23, further comprising:
suppressing the static elements in the parallax image to isolate dynamic elements in the parallax image.

25. The method of claim 23, further comprising:
grouping dynamic elements into targets according to variation within the temporal interval.

* * * * *